United States Patent
Itsuki (10) Patent No.: US 11,452,580 B2
(45) Date of Patent: Sep. 27, 2022

(54) ORTHODONTIC APPLIANCE AND PLIERS FOR ORTHODONTICS

(71) Applicants: Yasuhiro Itsuki, Tokyo (JP); OKADA MEDICAL SUPPLY CO., LTD., Tokyo (JP)

(72) Inventor: Yasuhiro Itsuki, Tokyo (JP)

(73) Assignees: Yasuhiro Itsuki, Tokyo (JP); OKADA MEDICAL SUPPLY CO., LTD., Tokyo (JP)

( * ) Notice: Subject to any disclaimer, the term of this patent is extended or adjusted under 35 U.S.C. 154(b) by 0 days.

(21) Appl. No.: 17/623,258

(22) PCT Filed: May 18, 2021

(86) PCT No.: PCT/JP2021/018855
§ 371 (c)(1),
(2) Date: Dec. 28, 2021

(87) PCT Pub. No.: WO2021/256148
PCT Pub. Date: Dec. 23, 2021

(65) Prior Publication Data
US 2022/0202536 A1    Jun. 30, 2022

(30) Foreign Application Priority Data

Jun. 19, 2020  (JP) .............................. JP2020-106351
Dec. 10, 2020  (JP) .............................. JP2020-204729

(51) Int. Cl.
*A61C 7/00*     (2006.01)
*A61C 7/28*     (2006.01)
(Continued)

(52) U.S. Cl.
CPC .............. *A61C 7/28* (2013.01); *A61C 8/0096* (2013.01); *A61C 7/04* (2013.01)

(58) Field of Classification Search
CPC .... A61C 7/28; A61C 7/10; A61C 7/12; A61C 8/0096
(Continued)

(56) References Cited

U.S. PATENT DOCUMENTS 2,954,606 A    10/1960  Peak
3,555,677 A     1/1971  Cusato
(Continued)

FOREIGN PATENT DOCUMENTS

CN     2768709       4/2006
JP     H08275960    10/1996
(Continued)

OTHER PUBLICATIONS

"Office Action of Japan Counterpart Application" with English translation thereof, dated Mar. 23, 2021, p. 1-p. 4.
(Continued)

*Primary Examiner* — Nicholas D Lucchesi
(74) *Attorney, Agent, or Firm* — JCIPRNET (57) ABSTRACT

An orthodontic appliance is provided and includes: a base member fixed to two or more screws implanted in a vicinity of median palatine suture of a palate bone; an arm-shaped arm member having a first connecting portion connected to the base member and a second connecting portion located in a vicinity of palatal side of a tooth; and a traction member that is made of an elastic wire material and pulls a tooth as the traction target. The traction member has a traction base portion, a traction fixation portion, and a traction force generation portion. The traction fixation portion has a bent portion in which the wire material extending along dentition is plastically deformed and bent toward a tooth root side. The bent portion is hooked on a protruding portion protruding to a palate side in a bracket.

2 Claims, 9 Drawing Sheets

(51) Int. Cl.
*A61C 8/00* (2006.01)
*A61C 7/04* (2006.01)

(58) Field of Classification Search
USPC ..................................................... 433/10, 18
See application file for complete search history.

(56) References Cited

U.S. PATENT DOCUMENTS

| | | | | |
|---|---|---|---|---|
| 5,538,427 | A * | 7/1996 | Hoffman | A61B 17/663 433/201.1 |
| 5,769,630 | A * | 6/1998 | Hoffman | A61C 8/0031 433/7 |
| 5,820,369 | A * | 10/1998 | Kvarnstrom | A61C 8/0031 433/7 |
| 6,358,255 | B1 * | 3/2002 | Testa | A61C 7/10 433/7 |
| 2011/0165532 | A1 * | 7/2011 | Benvegnu' | A61C 7/287 433/18 |
| 2011/0300503 | A1 * | 12/2011 | Benvegnu | A61C 7/00 433/22 |
| 2016/0296303 | A1 * | 10/2016 | Parker | A61N 1/0548 |
| 2019/0046292 | A1 * | 2/2019 | Han | A61C 8/0096 |
| 2020/0085538 | A1 * | 3/2020 | Kim | A61C 7/10 |

FOREIGN PATENT DOCUMENTS

| | | |
|---|---|---|
| JP | 2004136134 | 5/2004 |
| JP | 2004174278 | 6/2004 |
| JP | 5566549 | 8/2014 |
| JP | 2018526181 | 9/2018 |
| JP | 6601991 | 11/2019 |
| RU | 187152 | 2/2019 |
| WO | 2012099439 | 7/2012 |
| WO | 2018135567 | 7/2018 |

OTHER PUBLICATIONS

"International Search Report (Form PCT/ISA/210) of PCT/JP2021/018855", dated Jul. 13, 2021, with English translation thereof, pp. 1-4.

"Office Action of Russia Counterpart Application", dated Mar. 11, 2022, with English translation thereof, p. 1-p. 15.

"Office Action of Singapore Counterpart Application", dated Jun. 28, 2022, p. 1-p. 8.

* cited by examiner (a)

ORTHODONTIC APPLIANCE AND PLIERS FOR ORTHODONTICS

CROSS-REFERENCE TO RELATED APPLICATION

This application is a 371 application of the international PCT application serial no. PCT/JP2021/018855, filed on May 18, 2021, which claims the priority benefits of Japan application no. 2020-106351 filed on Jun. 19, 2020, and Japan application no. 2020-204729 filed on Dec. 10, 2020. The entirety of each of the abovementioned patent applications is hereby incorporated by reference herein and made a part of this specification.

TECHNICAL FIELD

The present invention relates to an orthodontic appliance and pliers for orthodontics.

BACKGROUND ART

In orthodontics, teeth are aligned by applying a three-dimensional orthodontic force such as front-back or right-left force, tilting force, or rotational force to one or more of the teeth to be moved. Applying the orthodontic force to the teeth includes fixing brackets to the teeth, attaching a wire or the like between a bracket for a reference tooth and a bracket for a tooth to be moved, and tightening the wire. By adjusting the wire routing, tightening method, etc., the orthodontic force is applied in the desired direction.

In an implant device for orthodontics, a screw or anchor is implanted in a bone in the mouth cavity, and the screw or the like is used as a fixed end to apply an orthodontic force to a desired tooth. A plate, a wire, or the like is fixed to the implanted screw or the like, and the orthodontic force is applied to the tooth through the plate, wire, or the like (e.g., Patent Document 1). Another configuration is also disclosed, in which a fixing portion as a support for orthodontics is fixed to a jawbone and an exposed portion is exposed in the mouth cavity (see, for example, Patent Documents 2 to 4).

Patent Document 5 discloses pliers for manufacturing a wire for orthodontics according to a novel orthodontic scheme.

PRIOR ART DOCUMENTS

Patent Documents

Patent Document 1: JP 6601991B
Patent Document 2: JP 2004-174278A
Patent Document 3: JP 2004-136134A
Patent Document 4: WO 2018/135567
Patent Document 5: JP 5566549B

DISCLOSURE OF THE INVENTION

Problems to be Solved by the Invention

Objects of the present invention include providing an orthodontic appliance and a method of attaching the orthodontic appliance according to a novel orthodontic scheme and providing pliers for orthodontics suitable for attaching the orthodontic appliance.

Means for Solving the Problems

An aspect of the present invention provides an orthodontic appliance comprising: a base member fixed to two or more screws implanted in the vicinity of median palatine suture of a palate bone; an arm-shaped arm member having a first connecting portion connected to the base member and a second connecting portion located in the vicinity of palatal side of a tooth; and a traction member that is made of an elastic wire material and pulls a tooth as the traction target. The traction member has a traction base portion fixed to the second connecting portion, a traction fixation portion hooked on a bracket that is fixed to the traction target located away from the traction base portion, and a traction force generation portion that is located between the traction base portion and the traction fixation portion and applies a rearward traction force and a frontward rotational force or a frontward traction force and a rearward rotational force to the bracket via the traction fixation portion. The traction fixation portion has a bent portion in which the wire material extending along the dentition is plastically deformed and bent toward the tooth root side. The bent portion is hooked on a protruding portion protruding to the palate side in the bracket.

As a specific example, the traction base portion may be located behind a first molar, the traction force generation portion may apply the rearward traction force and the frontward rotational force to the bracket, and the bent portion may be a portion in which the wire material extending frontward is plastically deformed and bent toward the tooth root side.

Another aspect of the present invention provides a pliers for orthodontics comprising a pair of plier main bodies that are rotatable about a coupling portion. The pair of plier main bodies each have one end portion at which an acting portion is located and another end portion at which a grip portion is located. One of the pair of plier main bodies is a first plier having a clamping surface of the acting portion. The clamping surface is provided along a second direction that is angled at a predetermined angle with respect to a first direction in which the grip portion extends from the coupling portion. The acting portion includes a bending portion that bends the wire material to form a bent portion, a cutting portion that cuts the wire material on a tip side of the bent portion, and a holding portion that holds a wire piece formed by the cutting. The bending portion, the cutting portion, and the holding portion are arranged on the clamping surface along the second direction with the cutting portion as the center.

In the pliers for orthodontics, the clamping surface is angled at a predetermined angle (e.g., 45 degrees) with respect to the first direction in which the first plier extends; therefore, by arranging the acting portion of the first plier so that the first direction is aligned with the protruding direction of the wire provided so as to protrude frontward in the mouth cavity and by grasping the grip portion so that the acting portion of the second plier arranged on the tooth root side comes close to the acting portion of the first plier, it is easily achieved to cut a part of the tip of the wire and bend the tip portion of the wire along the second direction at a position slightly behind the cutting portion.

Usually, in the mouth cavity, the tip of a wire is not arranged in a bent state in the vicinity of the tip while protruding frontward, but in the following orthodontic appliance according to another aspect of the present invention, the wire is arranged in the mouth cavity in the above state. Specifically, the orthodontic appliance according to another aspect of the present invention comprises: a base member fixed to two or more screws implanted in the vicinity of median palatine suture of a palate bone; an arm-shaped arm member having a first connecting portion connected to the base member and a second connecting portion located in the vicinity of palatal side of a molar tooth; and a traction member that is made of an elastic wire material and pulls a tooth as the traction target. The traction member has a traction base portion that is located behind a first molar and fixed to the second connecting portion, a traction fixation portion hooked on a bracket that is fixed to the traction target located ahead of the traction base portion, and a traction force generation portion that is located between the traction base portion and the traction fixation portion and applies a rearward traction force and a frontward rotational force to the bracket via the traction fixation portion. The traction fixation portion has a bent portion in which the wire material extending frontward is plastically deformed and bent toward the tooth root side. The bent portion is hooked on a protruding portion protruding to the palate side in the bracket.

According to the above configuration, the traction fixation portion applies a rearward tensile force and a frontward rotational force to the bracket. The bracket is located on the tooth crown side of the traction target tooth's center of gravity, and thereby the traction force applied to the traction target via the bracket moves the traction target rearward and rotates the tooth itself rearward, but as described above, the traction fixation portion applies a frontward rotational force to the bracket; therefore, the rearward rotational force due to the traction force is canceled, and the tooth as the traction target only moves rearward.

In the above orthodontic appliance, it is necessary to elastically deform the traction fixation portion so that the traction force and the frontward rotational force can be applied to the bracket, bring the tip of the wire protruding frontward into contact with the front side and tooth root side of the bracket in a state in which the tip of the wire is biased to the rear side and the tooth root side, and keep this state. Specifically, it is necessary to bend the tip portion of the wire, which is arranged so as to protrude frontward in the mouth cavity, so that the wire is caught in the slot of the bracket and cut the wire at an appropriate position on the tip side of the bent portion of the wire (portion in contact with the slot of the bracket) formed by the bending.

In the conventional pliers for orthodontics, however, it is very difficult to bend the tip of the wire, which is arranged so as to protrude frontward in the mouth cavity, toward the tooth root side. With the pliers for orthodontics according to an aspect of the present invention, as described above, it is easy to bend a part of the wire protruding frontward toward the tooth root side and cut it at a predetermined position on the tip side of the bent portion.

In the above pliers for orthodontics, the holding portion may be located on the coupling portion side of the cutting portion.

In the acting portion, a clamping gap of the bending portion is preferably wider than a clamping gap of the holding portion.

In the acting portion, two bending and holding portions each having a bending function for the wire and a holding function for the wire piece may be arranged with the cutting portion in between. When the tip of the wire is located proximal to the coupling portion with respect to the cutting portion, the bending and holding portion distal to the coupling portion serves as the bending portion while the bending and holding portion proximal to the coupling portion serves as the holding portion, and when the tip of the wire is located distal to the coupling portion with respect to the cutting portion, the bending and holding portion distal to the coupling portion serves as the holding portion while the bending and holding portion proximal to the coupling portion serves as the bending portion.

The acting portion may have two clamping surfaces with respect to a symmetry plane that is a first plane orthogonal to a rotation axis of the coupling portion and including the first direction in the plane, and in each of the two clamping surfaces, the bending portion, the cutting portion, and the holding portion may be arranged along the second direction.

Still another aspect of the present invention provides a method of attaching the above orthodontic appliance. In this method, when the traction member, which is made of an elastic wire material and pulls a tooth as the traction target, is engaged with a protruding portion protruding to the palate side in the bracket, the wire material is elastically deformed and cut by using the above pliers for orthodontics.

Effect of the Invention

According to the present invention, there is provided an orthodontic appliance that can move a tooth as the traction target rearward while suppressing the influence of rearward rotation. Moreover, according to the present invention, there is also provided a method of attaching such an orthodontic appliance. The pliers for orthodontics used in the attaching method can form a bent portion of the wire that is bent toward the tooth root side and cut the wire on the tip side of the bent portion. The wire is arranged to protrude frontward in the mouth cavity in a state of being biased so as to incline toward the tooth root side while being displaced rearward.

BRIEF DESCRIPTION OF DRAWINGS

In FIG. 1, (a) is a front view of the pliers for orthodontics according to an embodiment (first embodiment) of the present invention, and (b) is a rear view of the pliers for orthodontics according to the first embodiment.

In FIG. 5, (a) is a structural explanatory view of the acting portions of the pliers for orthodontics according to still another embodiment (third embodiment) of the present invention, (b) is an operational explanatory view (part 1) of the pliers for orthodontics according to the third embodiment, and (c) is an operational explanatory view (part 2) of the pliers for orthodontics according to the third embodiment.

EMBODIMENTS FOR CARRYING OUT THE INVENTION

Hereinafter, embodiments of the present invention will be described with reference to the drawings. In the following description, the same members are denoted by the same reference numerals and the description of members once explained may be omitted.

Figure 1:
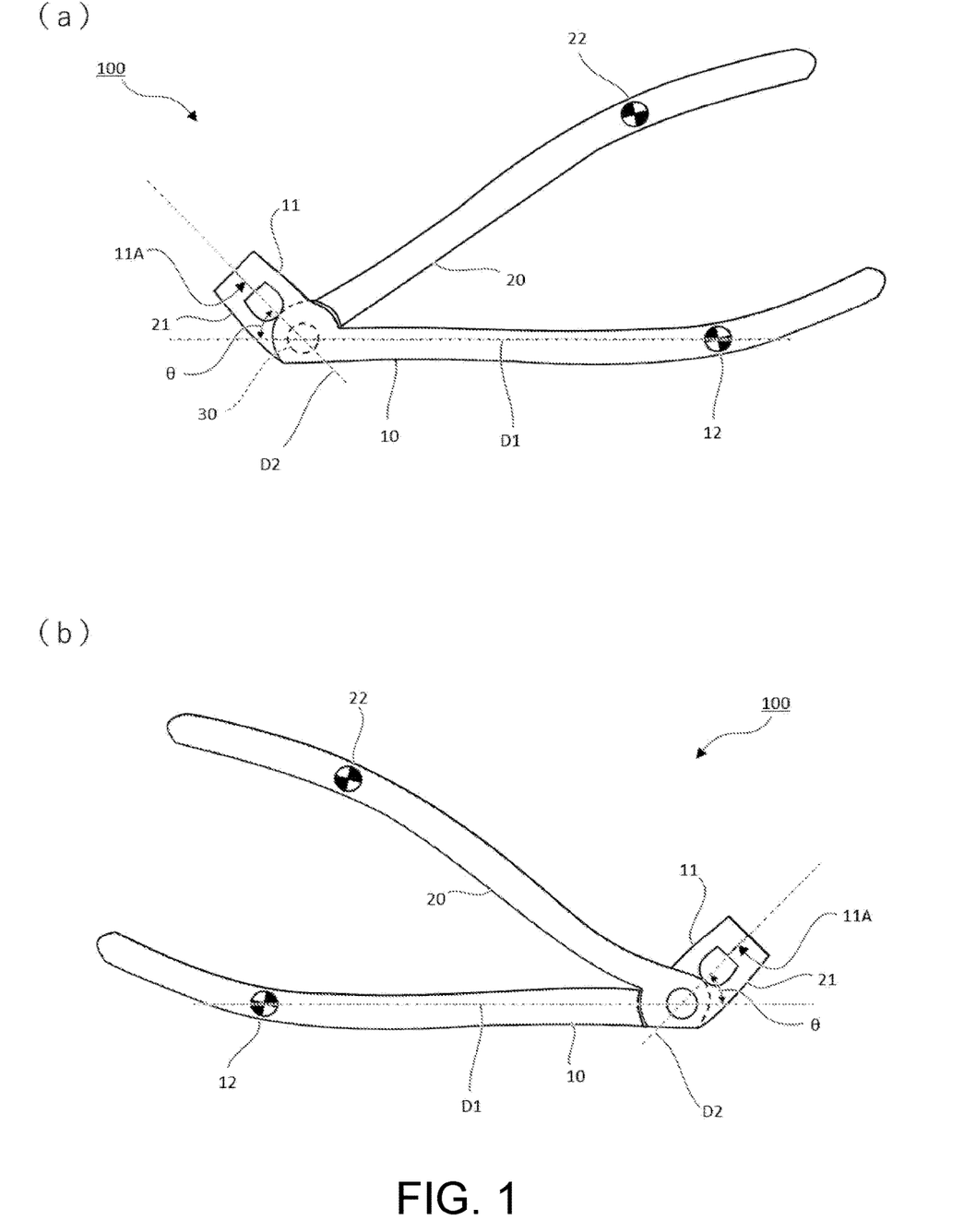

In FIG. 1, (a) is a front view of the pliers for orthodontics according to an embodiment (first embodiment) of the present invention. In FIG. 1, (b) is a rear view of the pliers for orthodontics according to the first embodiment.

As illustrated in FIG. 1, pliers for orthodontics 100 (bend cutter) according to the first embodiment have a pair of plier main bodies (first plier 10 and second plier 20) that are rotatable about a coupling portion 30. A first acting portion 11 is located at one end portion of the first plier 10 while a first grip portion 12 is located at the other end portion. A second acting portion 21 is located at one end portion of the second plier 20 while a second grip portion 22 is located at the other end portion.

The first acting portion 11 has a clamping surface (first clamping surface 11A), which is provided along a second direction D2 that is angled at a predetermined angle with respect to a first direction D1 in which the first grip portion 12 extends from the coupling portion 30. In the pliers for orthodontics 100 illustrated in FIG. 1, an inclination angle θ formed between the first direction D1 and the second direction D2 is 45 degrees. The inclination angle θ can be set within a range of 30 to 60 degrees.

The first clamping surface 11A is angled in this way; therefore, when the first clamping surface 11A is brought close to a wire WM located inside a mouth cavity M of the patient as described with reference to FIG. 3, the first grip portion 12 is less likely to collide with the teeth in the mouth cavity M. Thus, the operation of bending/cutting the wire WM is easy.

The second acting portion 21 rises toward the grip portion (first grip portion 12, second grip portion 22) side with respect to the first direction D1 in accordance with the shape of the above first acting portion 11. The second acting portion 21 has such a shape, and therefore the degree of freedom in arranging the second acting portion 21, which is located on the tooth root side of the wire WM inside the mouth cavity M of the patient, is increased.

Figure 2:
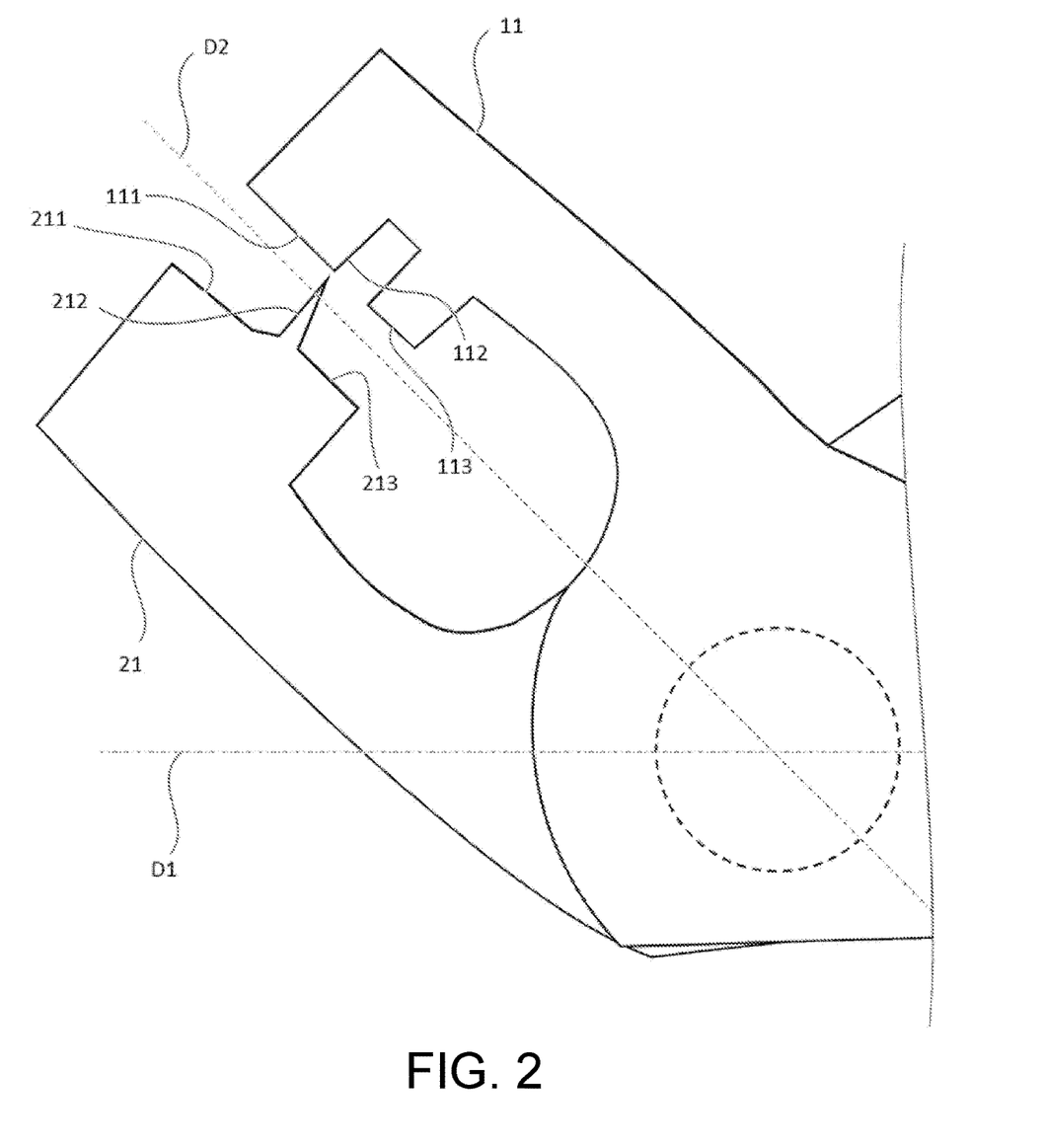
FIG. 2 is an enlarged view of the acting portions of (a) of FIG. 1.

As illustrated in FIG. 2, the first acting portion 11 includes a first bending portion 111 that bends the wire WM to form a bent portion BP, a first cutting portion 112 that cuts the wire WM on the tip side of the bent portion BP, and a first holding portion 113 that holds a wire piece WC formed by the cutting, which are arranged on the first clamping surface 11A along the second direction D2 with the first cutting portion 112 as the center.

Corresponding to the first acting portion 11, the second acting portion 21 includes a second bending portion 211, a second cutting portion 212, and a second holding portion 213, which are arranged in this order along the second direction D2. In FIG. 2, the second cutting portion 212 is provided with a protruding blade and the first cutting portion 112 is provided with a blade in the opening of a recessed portion; therefore, when the first acting portion 11 and the second acting portion 21 come close to each other, the blade of the second cutting portion 212 can cut the wire WM, which is located between the first acting portion 11 and the first grip portion 12, while being housed in the recessed portion of the first cutting portion 112.

The bending portions (first bending portion 111 and second bending portion 211) are portions that bend the wire WM located along the first direction D1 toward the second direction D2, and when bending the wire WM, the second bending portion 211 of the second plier 20 serves as the fulcrum while the first bending portion 111 of the first plier 10 serves as the point of action. The clamping gap between the bending portions (first bending portion 111 and second bending portion 211) is preferably a length of about 1.1 to 1.5 times the diameter of the wire WM. When the maximum diameter of the wire WM is slightly larger than 0.9 mm (e.g., 0.036 inch), the clamping gap between the bending portions (first bending portion 111 and second bending portion 211) is preferably about 1.2 mm. When the wire WM is bent, the wire WM is in a slightly bent state in this clamping gap.

The holding portions (first holding portion 113 and second holding portion 213) have to hold the wire piece WC, which is formed by being cut by the cutting portions (first cutting portion 112 and second cutting portion 212), while bending the wire WM so that the wire piece WC does not fall into the mouth cavity M. Therefore, the clamping gap between the holding portions (first holding portion 113 and second holding portion 213) is preferably narrower than the clamping gap between the bending portions (first bending portion 111 and second bending portion 211). Specifically, the clamping gap between the holding portions (first holding portion 113 and second holding portion 213) is preferably equal to the diameter of the wire WM (e.g., 0.9 mm). Additionally or alternatively, the protruding width of the blade provided at the second cutting portion 212 is preferably larger than the clamping gap between the holding portions (first holding portion 113 and second holding portion 213). Through this settings, the wire WM is held by the holding portions (first holding portion 113 and second holding portion 213) after the cutting of the wire WM by the cutting portions (first cutting portion 112 and second cutting portion 212) is completed, and it is therefore possible to reduce the possibility that the cutting of the wire WM is performed improperly.

Figure 3:
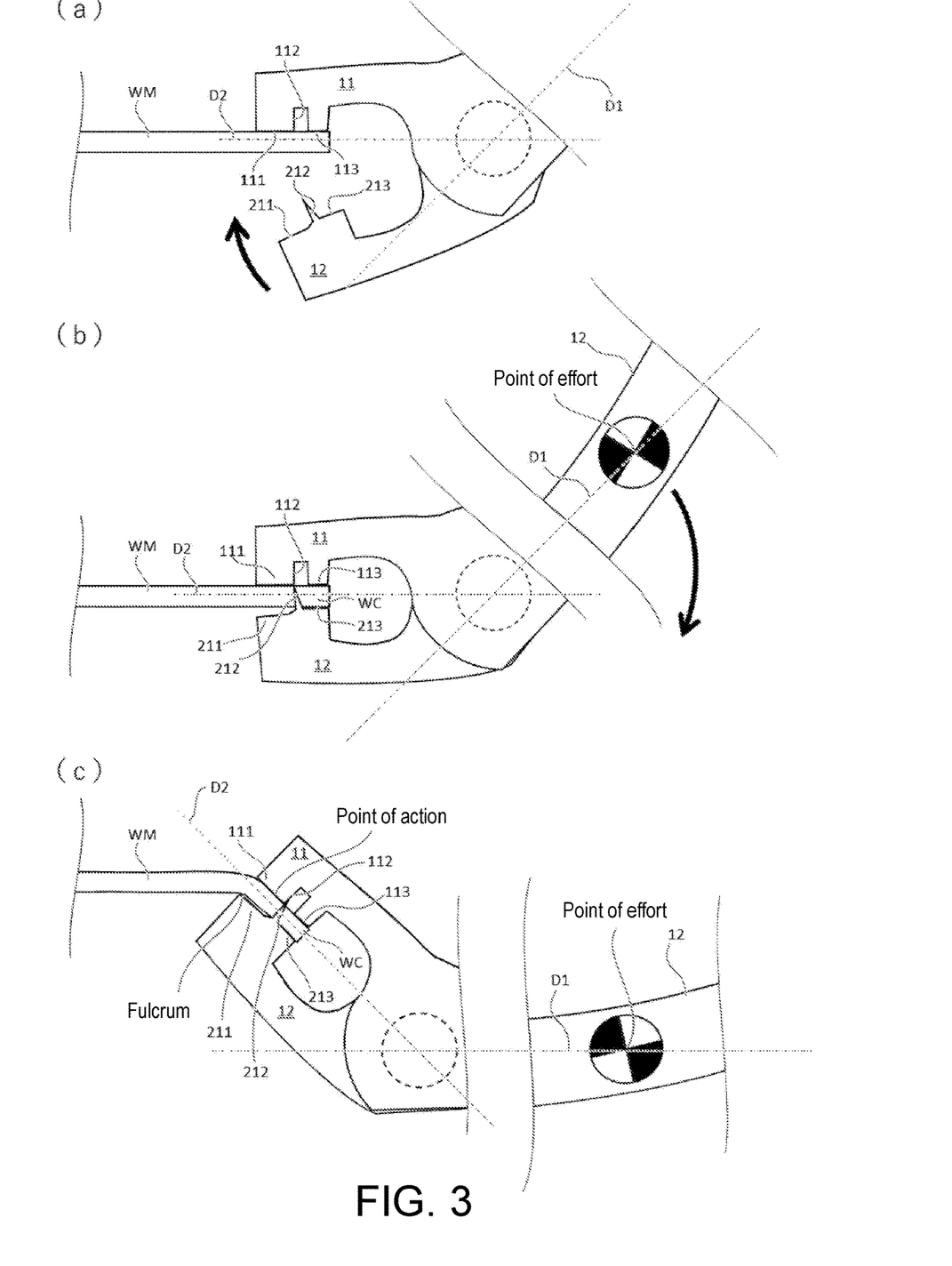
FIG. 3 is a set of operation explanatory views of the pliers for orthodontics according to the first embodiment.

FIG. 3 is a set of operation explanatory views of the pliers for orthodontics according to the first embodiment. As illustrated in (a) of FIG. 3, first, the first acting portion 11 of the pliers for orthodontics 100 is located above the wire WM (on the tooth crown side of the dentition) while aligning the protruding direction of the wire WM, which is arranged so as to protrude frontward in the mouth cavity M, with the second direction D2 of the pliers for orthodontics 100. At this time, the first grip portion 12 extending in the first direction D1 does not collide with the teeth.

Then, from the state illustrated in (a) of FIG. 3, the second grip portion 22 is rotated to approach the first grip portion 12 so that the second acting portion 21 approaches the first acting portion 11. Through this operation, as illustrated in (b) of FIG. 3, the wire WM is cut by the blade of the first cutting portion 112 and the blade of the second cutting portion 212 to form the wire piece WC. The formed wire piece WC is held by the holding portions (first holding portion 113 and second holding portion 213) and does not fall into the mouth cavity M.

Subsequently, as illustrated in (c) of FIG. 3, the wire WM located between the bending portions (first bending portion 111 and second bending portion 211) is bent. The first grip portion 12 is pushed down (moved to the tooth root side) together with the second grip portion 22 with the tip of the second bending portion 211 serving as the fulcrum, thereby allowing the wire WM to bend to the tooth root side (lingual side) with the first bending portion 111 serving as the point of action. The bent portion BP of the wire WM ranges from a portion in contact with the fulcrum of the second bending portion 211 to a portion in contact with the first bending portion 111. The first direction D1 when the wire WM is bent ((c) of FIG. 3) is just at the position of the second direction D2 in the state illustrated in (a) of FIG. 3, and the first grip portion 12 is therefore avoided from colliding with the teeth.

Figure 4:
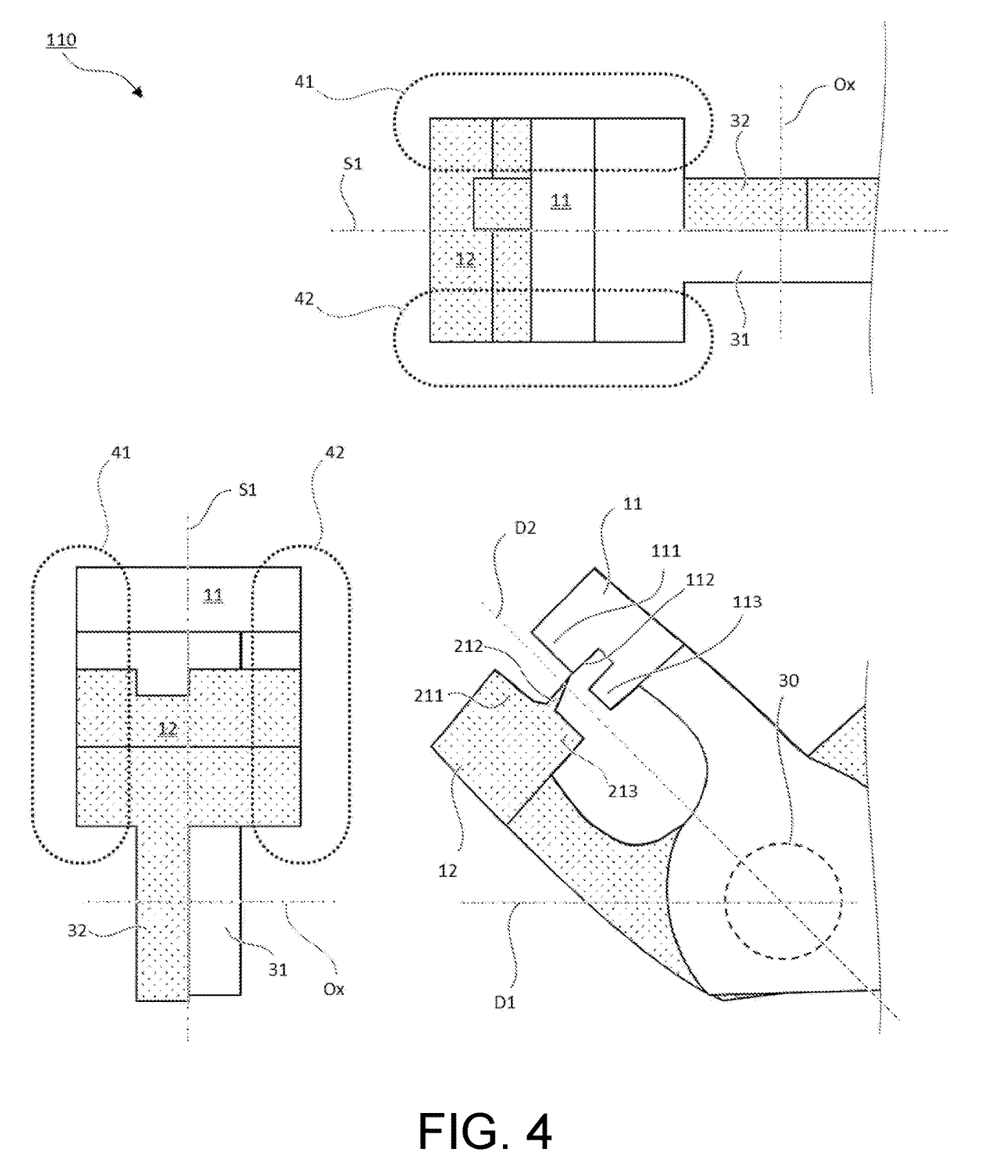
FIG. 4 is a set of a front view, a left side view, and a plan view of the pliers for orthodontics according to another embodiment (second embodiment) of the present invention.

FIG. 4 is a set of a front view, a left side view, and a plan view of the pliers for orthodontics according to another embodiment (second embodiment) of the present invention. In FIG. 4, the second plier 20 is hatched so that the structure is easily understood.

Pliers for orthodontics 110 according to the second embodiment have two sets of acting portions. The two sets of acting portions have respective two sets of clamping surfaces with respect to a symmetry plane that is a first plane S1 orthogonal to a rotation axis Ox of the coupling portion 30 and including the first direction D1 in the plane.

The first plane S1 is located in a sliding plane between a portion (first coupling portion 31) of the first plier 10 at which the coupling portion 30 is located and a portion (second coupling portion 32) of the second plier 20 at which the coupling portion 30 is located. The pliers for orthodontics 110 according to the second embodiment have two sets of acting portions with the first plane S1 in between. For facilitating the following description, one of the sets of acting portions will be referred to as a "right set of acting portions 41" and the other set of acting portions will be referred to as a "left set of acting portions 42," hereinafter The structure of the right set of acting portions 41 and the structure of the left set of acting portions 42 are essentially the same as the structure of the acting portions (first acting portion 11 and second acting portion 21) of the pliers for orthodontics 100. That is, both on the clamping surfaces of the right set of acting portions 41 and on the clamping surfaces of the left set of acting portions 42, the bending portions (first bending portion 111 and second bending portion 211), the cutting portions (first cutting portion 112 and second cutting portion 212), and the holding portions (first holding portion 113 and second holding portion 213) are arranged along the second direction D2.

In other words when comparing the structure of the above pliers for orthodontics 110 with the structure of the pliers for orthodontics 100, the pliers for orthodontics 110 has a structure in which the acting portions (first acting portion 11 and first grip portion 12) of the pliers for orthodontics 100 protrude to each of the right and left sides. Having such a structure allows the acting portions (right set of acting portions 41 or left set of acting portions 42) to easily approach the wire WM from each side, and it is thus easy to align the wire WM with the second direction D2 in the pliers for orthodontics 110.

Figure 5:
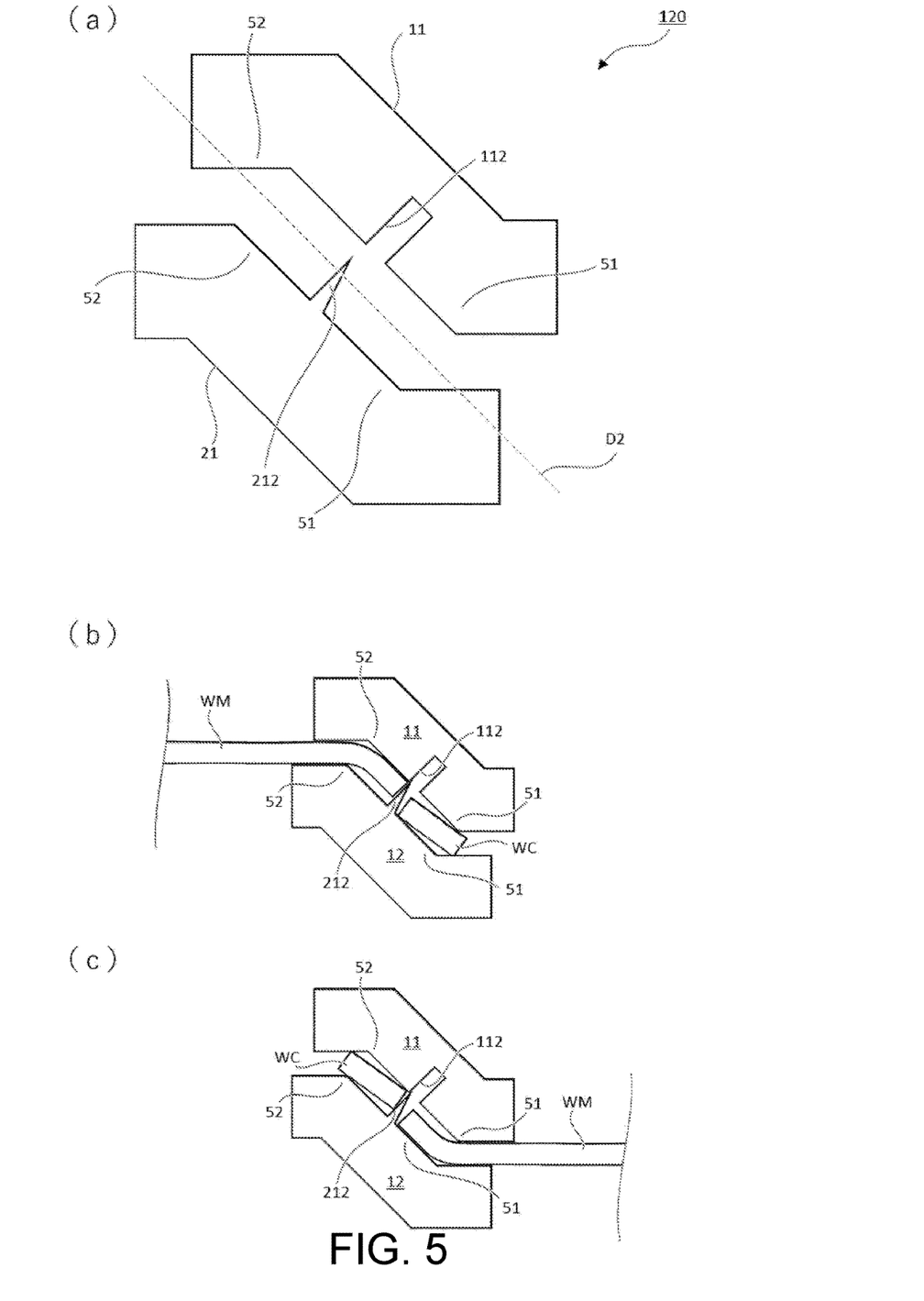

In FIG. 5, (a) is a structural explanatory view of the acting portions of the pliers for orthodontics according to still another embodiment (third embodiment) of the present invention. In FIG. 5, (b) is an operational explanatory view (part 1) of the pliers for orthodontics according to the third embodiment. In FIG. 5, (c) is an operational explanatory view (part 2) of the pliers for orthodontics according to the third embodiment.

As illustrated in (a) of FIG. 5, pliers for orthodontics 120 according to the third embodiment have a different detailed structure of the acting portions as compared with the pliers for orthodontics 100. That is, in the acting portions (first acting portion 11 and second acting portion 21) of the pliers for orthodontics 100, the bending portions (first bending portion 111 and second bending portion 211), the cutting portions (first cutting portion 112 and second cutting portion 212), and the holding portions (first holding portion 113 and second holding portion 213) are arranged along the second direction D2, whereas in the acting portions (first acting portion 11 and second acting portion 21) of the pliers for orthodontics 120, two sets of bending and holding portions having substantially the same structure are arranged with the cutting portions (first cutting portion 112 and second cutting portion 212) in between. For easy understanding, the bending and holding portions proximal to the coupling portion 30 will be referred to as "inner bending and holding portions 51," and the bending and holding portions located on the tip side of the pliers for orthodontics 120 (the bending and holding portions distal to the coupling portion 30) will be referred to as "outer bending and holding portions 52," hereinafter.

Both the inner bending and holding portions 51 and the outer bending and holding portions 52 have a bending function for the wire WM (function of the bending portions) and a holding function for the wire piece WC (function of the holding portions).

When the tip of the wire WM before being cut is located proximal to the coupling portion 30 with respect to the cutting portions (first cutting portion 112 and second cutting portion 212), the outer bending and holding portions 52 which are the bending and holding portions distal to the coupling portion 30 serve as the bending portions (first bending portion 111 and second bending portion 211). At the same time, the inner bending and holding portions 51 which are the bending and holding portions proximal to the coupling portion 30 serve as the holding portions (first holding portion 113 and second holding portion 213). That is, as illustrated in (b) of FIG. 5, when the tip of the wire WM after being cut is located so as to face the pliers for orthodontics 120, the inner bending and holding portions 51 function as the holding portions, while the outer bending and holding portions 52 function as the bending portions.

On the other hand, when the tip of the wire WM is located distal to the coupling portion 30 with respect to the cutting portions (first cutting portion 112 and second cutting portion 212), the bending and holding portions distal to the coupling portion 30 (outer bending and holding portions 52) serve as the holding portions (first holding portion 113 and second holding portion 213). At the same time, the bending and holding portions proximal to the coupling portion 30 (inner bending and holding portions 51) serve as the bending portions (first bending portion 111 and second bending portion 211). That is, as illustrated in (c) of FIG. 5, when the tip of the wire WM after being cut is located so as to face in the direction opposite to the pliers for orthodontics 120, the outer bending and holding portions 52 function as the holding portions, while the inner bending and holding portions 51 function as the bending portions.

Figure 6:
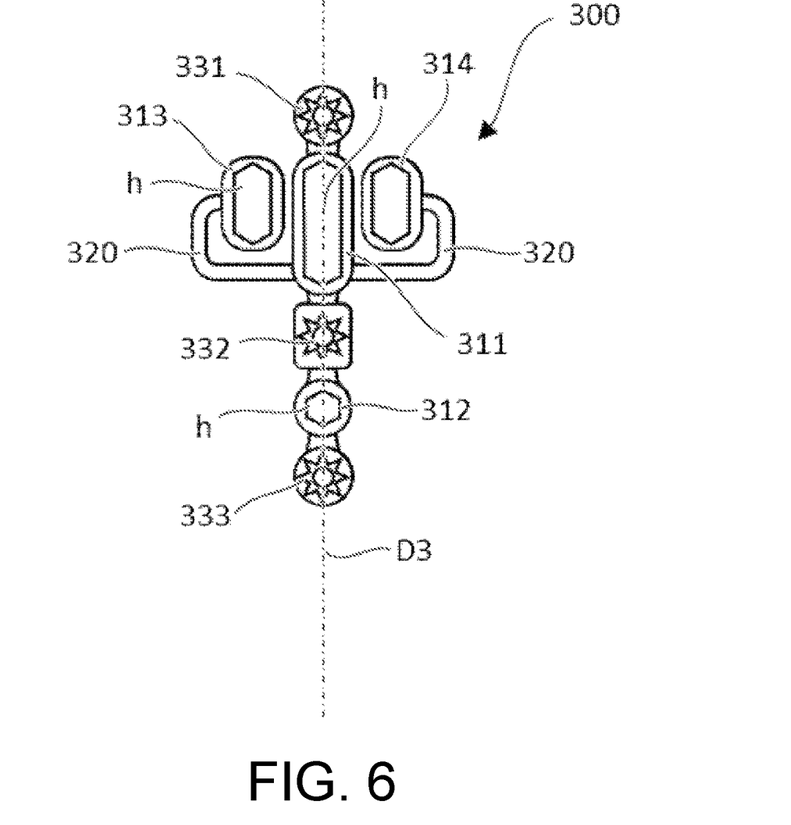
FIG. 6 is an explanatory view of a base member included in the orthodontic appliance according to an embodiment of the present invention.
Figure 7:
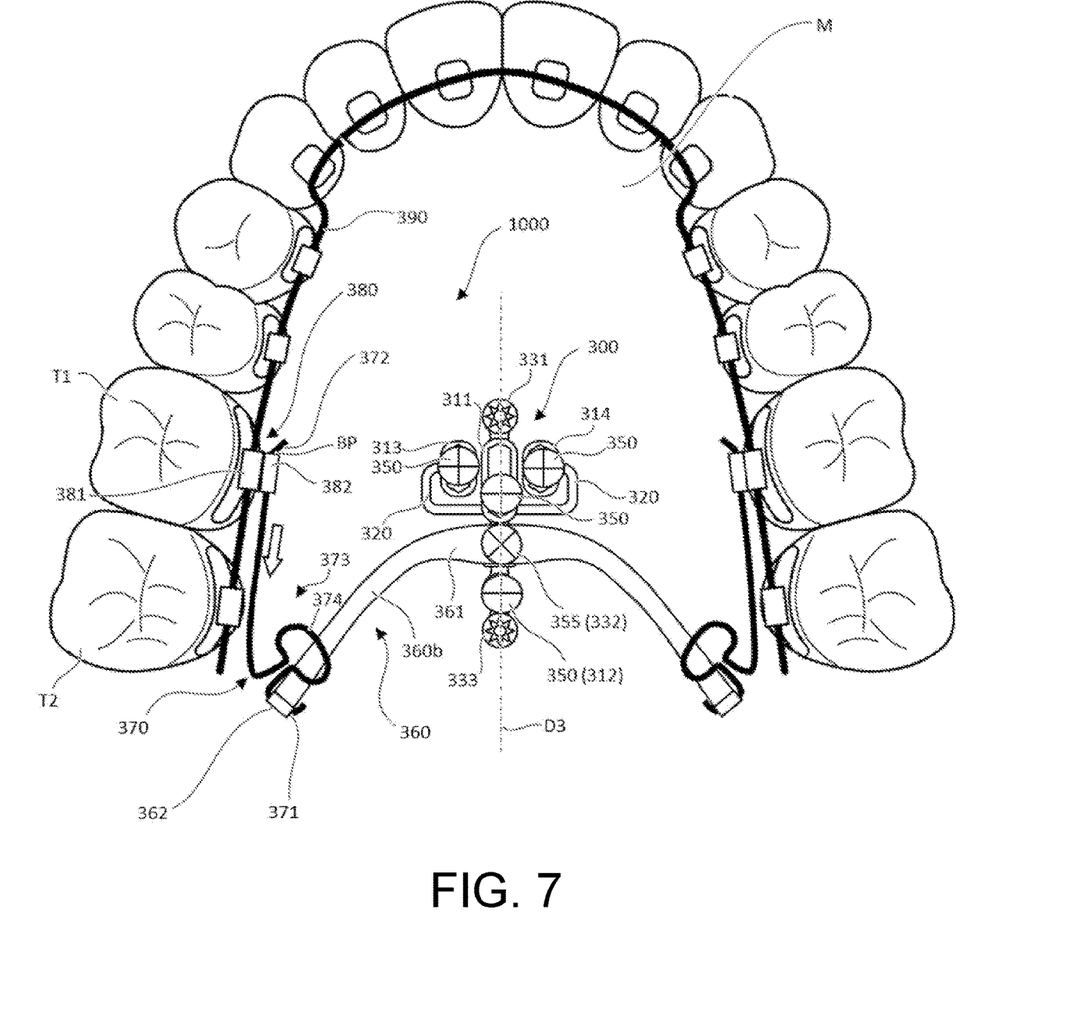
FIG. 7 is an explanatory view of the orthodontic appliance according to an embodiment of the present invention.

FIG. 6 is an explanatory view of a base member used in the orthodontic appliance according to an embodiment of the present invention. FIG. 7 is an explanatory view of the orthodontic appliance according to an embodiment of the present invention. For easy understanding of the present invention, FIG. 7 depicts the mouth cavity of a patient based on FIG. 2, etc. of Patent Document 1 to clarify the difference from the prior art.

Base member 300 illustrated in FIG. 6 has a first base portion 311, a second base portion 312, a third base portion 313, and a fourth base portion 314. Each base portion is provided with an engagement hole h. The engagement holes h of the first base portion 311, third base portion 313, and fourth base portion 314 are elongated holes extending in a third direction D3. These engagement holes h are engaged with polygonal head portions of respective screws 350. In FIG. 7, thread portions of four screws 350 are implanted in the vicinity of median palatine suture of the palate bone, and female screws are provided at the centers of the polygonal head portions passing through the engagement holes h. By tightening bolts to the female screws, the base member 300 is fixed to the screws 350.

Here, flexible connecting portions 320 are provided between the first base portion 311 and the third base portion 313 and between the first base portion 311 and the fourth base portion 314. This allows the four engagement holes h (of the first base portion 311 to the fourth base portion 314) to be easily fitted with polygonal head portions 352 of the screws 350 which are preliminarily implanted in the mouth cavity.

That is, after inserting two respective polygonal head portions 352 into the engagement hole h of the first base portion 311 and the engagement hole h of the second base portion 312, which are arranged in the third direction D3, two respective polygonal head portions 352 may be inserted into the engagement hole h of the third base portion 313 and the engagement hole h of the fourth base portion 314. The two connecting portions 320 have flexibility, and it is therefore easy to move the positions of the engagement hole h of the third base portion 313 and the engagement hole h of the fourth base portion 314 in the mouth cavity M.

The base member 300 illustrated in FIG. 6 has a first fixing portion 331 connected to the outside (front in the mouth cavity M) of the first base portion 311, a second fixing portion 332 provided between the first base portion 311 and the second base portion 312, and a third fixing portion 333 connected to the outside (rear in the mouth cavity M) of the second base portion 312.

In the base member 300 of an orthodontic appliance 1000 illustrated in FIG. 7, an arm member 360 is attached to the second fixing portion 332. The arm member 360 is an arm-shaped member having a main body portion 360b extending so as to intersect the third direction D3, and the main body portion 360b has first connecting portions 361 for being fixed to the second fixing portion 332 and second connecting portions 362 located in the vicinities of palatal sides of molar teeth (second molars T2). The first connecting portions 361 are fixed by a fixing screw 355 to the second fixing portion 332 so as not to be rotatable.

A traction member 370 is attached to each second connecting portion 362, and the traction member 370 is fixed and elastically deformed at the second connecting portion 362. Therefore, the stress due to this elastic deformation is generated in the second connecting portion 362 of the arm member 360, and the second fixing portion 332 of the base member 300 receives an external force for rotating or twisting the base member 300 in the mouth cavity M.

However, as described above, the base member 300 is fixed to the screws 350 at three or more locations, specifically four locations, and the third base portion 313 and the fourth base portion 314 are engaged with the screws 350 at locations deviated from the arrangement (third direction D3) of the engaging portion in the first base portion 311 and the engaging portion in the second base portion 312. Therefore, even if a strong external force is applied to the second fixing portion 332 of the base member 300, the possibility that the base member 300 is displaced is appropriately suppressed.

The traction member 370 is made of an elastic wire material and pulls a tooth as the traction target (first molar T1 in FIG. 7). The wire material is made, for example, of GUMMETAL (registered trademark) and has a Young's modulus lower than that of the material constituting the arm member 360. Specifically, the material constituting the arm member 360 is, for example, stainless steel SUS316, and its Young's modulus is 150 GPa or more (about 200 GPa). On the other hand, the Young's modulus of the GUMMETAL, which is an example of the wire material constituting the traction member 370, is 100 GPa or less (40 GPa to 80 GPa). Therefore, when the traction member 370 is fixed in a biased state, the arm member 360 is not substantially deformed, and only the traction member 370 is elastically deformed.

The traction member 370 has a traction base portion 371, a traction fixation portion 372, and a traction force generation portion 373. The traction base portion 371 is a portion that is located behind the first molar T1 and fixed to the second connecting portion 362 of the arm member 360. By arranging the traction base portion 371 at this location, it becomes easy to pull a tooth as the traction target (first molar T1 in FIG. 7) rearward. In FIG. 7, at the traction base portion 371, the wire material is bent and hooked on the second connecting portion 362 to prevent the traction member 370 from moving frontward.

The traction fixation portion 372 is hooked on a bracket 380 that is fixed to the traction target (first molar T1 in FIG. 7) located ahead of the traction base portion 371. The bracket 380 attached to the first molar T1 has a first slot 381 for receiving an arch wire 390 and determining the relative position to the arch wire 390 and a second slot 382 for engaging with the traction member 370 and determining the relative position to the traction member 370. The traction member 370 is hooked on the bracket 380 at the second slot 382, and the traction force of the traction member 370 is thereby transmitted to the bracket 380 to pull the first molar T1 rearward and also pull the teeth (anterior teeth) anterior to the first molar T1 rearward via the arch wire 390 fixed to the first slot 381.

The traction force generation portion 373 has a T-loop 374 located between the traction base portion 371 and the traction fixation portion 372. In FIG. 7, the T-loop 374 is opened and fixed in a state in which the wire material between the T-loop 374 and the traction fixation portion 372 is bent so as to be separated from the T-loop 374. Therefore, the traction force generation portion 373 applies a rearward traction force and a frontward rotational force to the bracket 380 via the traction fixation portion 372. The portion which generates the traction force in the traction force generation portion 373 is not limited to the T-loop 374. It may be an L loop or a circular loop.

In order that the traction force and the frontward rotational force are appropriately transmitted to the bracket 380, the traction fixation portion 372 has a bent portion BP in which the wire material extending frontward is plastically deformed and bent toward the tooth root side, and the bent portion BP is hooked on the protruding portion (substantially the second slot 382) protruding to the palate side in the bracket 380.

The bracket 380 is attached to the crown of a tooth as the traction target (first molar T1). On the other hand, the center of gravity of the tooth is located on the tooth root side of the crown. Therefore, if only the force for simply moving the tooth rearward is applied by using the bracket 380, the rotation of the tooth crown directed rearward (rearward rotation, centrifugal rotation) inevitably occurs.

In this context, the traction force generation portion 373 generates not only the rearward traction force by the closing force of the T-loop 374 but also the frontward rotational force by the force of returning the bent wire material, and it is thereby realized to cancel the rearward rotational force generated when the tooth as the traction target (first molar T1) moves rearward and allow the tooth as the traction target (first molar T1) to move rearward substantially without rotating.

In the case in which the wire is pulled by a coil spring or rubber as in the conventional technique, the force of moving the wire rearward when the extended coil spring or rubber returns to the original length can be applied, but it is not possible to apply the frontward rotational force to the bracket 380. The traction member 370 is made of the wire material, so that not only the traction force but also the force in various directions can be applied at the same time, and as a result, the tooth as the traction target can be appropriately moved.

Thus, in the orthodontic appliance 1000, the wire material constituting the traction member 370 protrudes frontward in the mouth cavity M, and the bent portion BP which hooks on the bracket 380 is provided in the vicinity of the front tip of the wire material to form the traction fixation portion 372. The traction force and the frontward rotational force are applied to the bracket 380 at the bent portion BP of the traction fixation portion 372; therefore, in order for the orthodontic appliance 1000 to function properly, it is necessary to bend the vicinity of the tip of the wire material, which protrudes frontward in the mouth cavity M, to the tooth root side. The pliers for orthodontics 100, 110, and 120 according to the previously described present embodiments are effective tools from the viewpoint of achieving this purpose.

Figure 8:
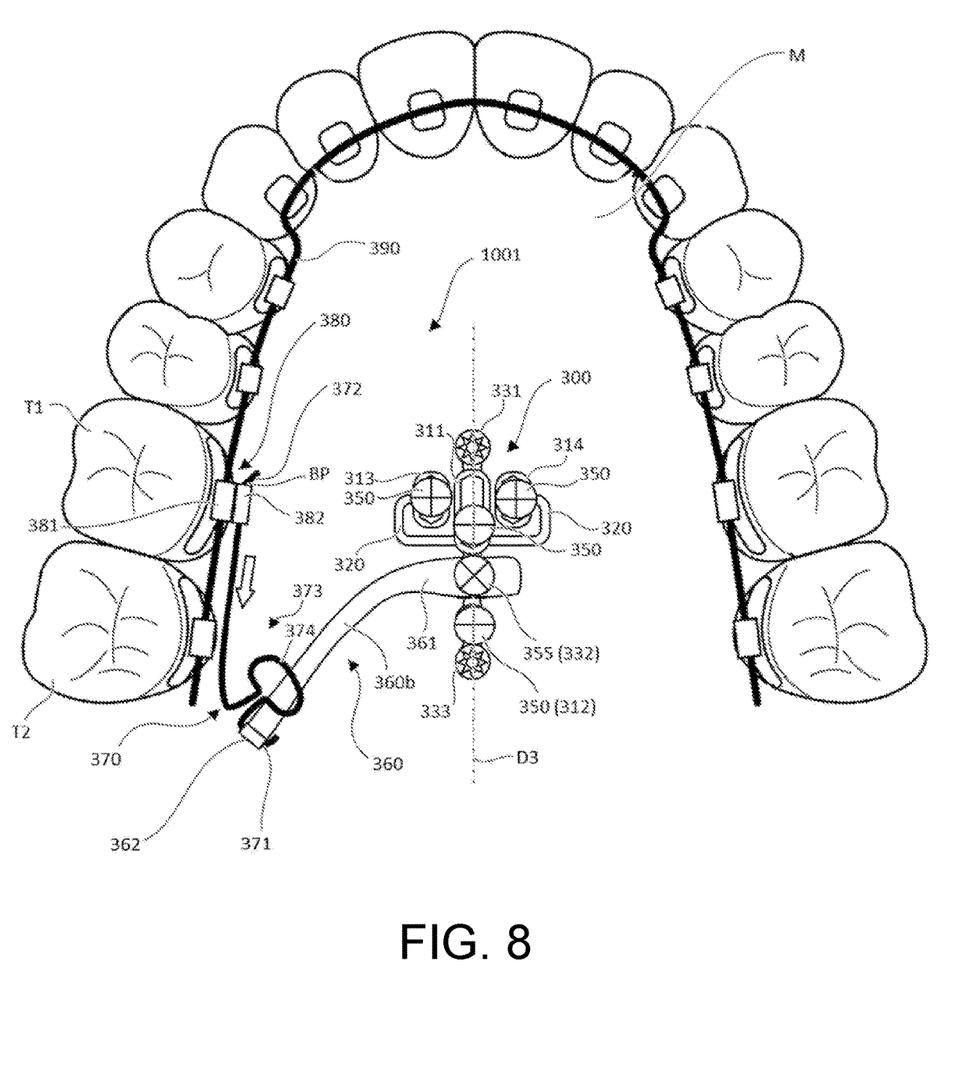
FIG. 8 is an explanatory view of the orthodontic appliance according to a modified example of an embodiment of the present invention.

FIG. 8 is an explanatory view of the orthodontic appliance according to a modified example of an embodiment of the present invention. In the orthodontic appliance 1000 illustrated in FIG. 7, the arm member 360 spreads out to the right and left in the mouth cavity M and has two second connecting portions 362, but in an orthodontic appliance 1001 illustrated in FIG. 8, the arm member 360 spreads out to only one side in the mouth cavity M and has only one second connecting portion 362. In such a case, a strong rotational force is applied to the base member 300 from the first connecting portion 361, but as described previously, the base member 300 is fixed firmly by three or more, specifically four screws 350, and therefore the base member 300 is less likely to come loose.

Figure 9:
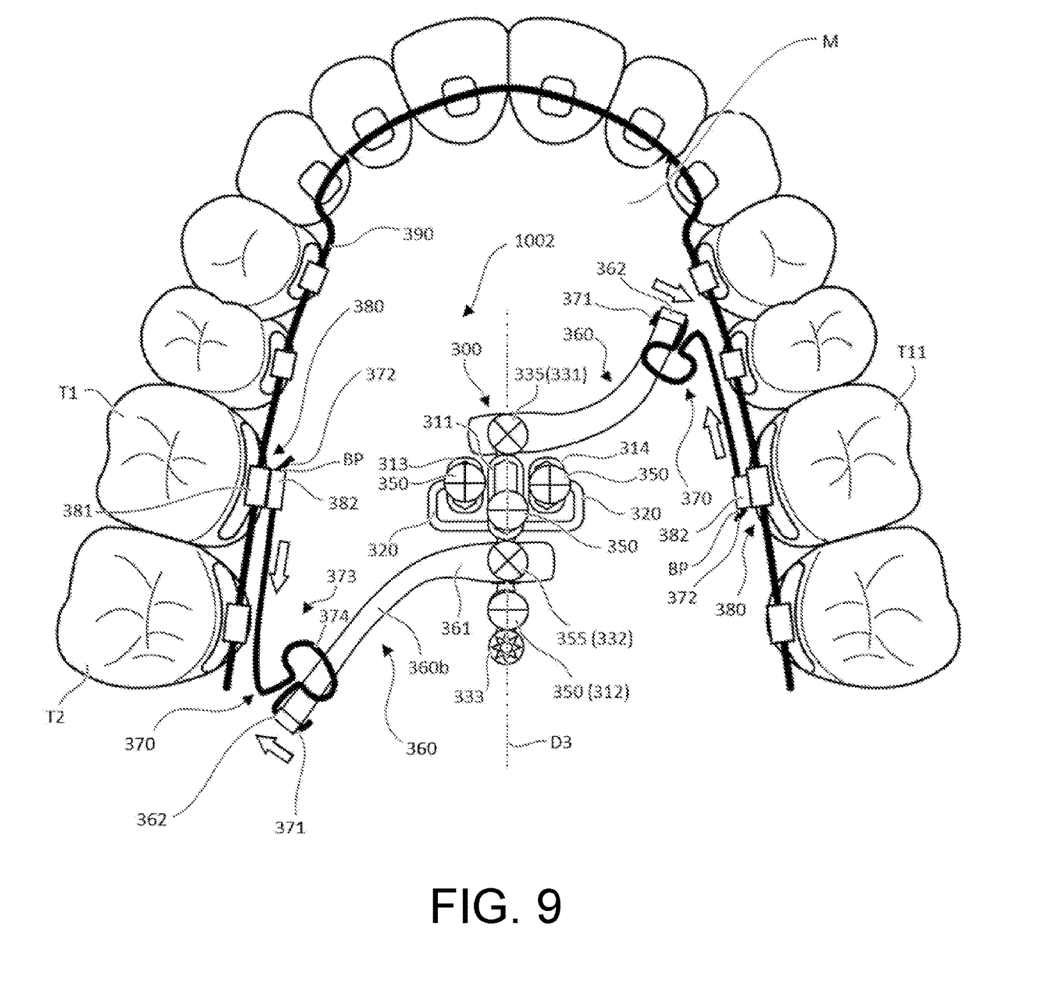
FIG. 9 is an explanatory view of the orthodontic appliance according to another modified example of an embodiment of the present invention.

FIG. 9 is an explanatory view of the orthodontic appliance according to another modified example of an embodiment of the present invention. In the orthodontic appliance 1001 illustrated in FIG. 8, the arm member 360 spreads out to the left side in the mouth cavity M and has one second connecting portion 362, but an orthodontic appliance 1002 illustrated in FIG. 9 has an arm member 360 attached to the second fixing portion 332 and another arm member 360 attached to the first fixing portion 331.

The traction member 370 is attached to the arm member 360 attached to the second fixing portion 332. The traction target of the traction member 370 is the left first molar T1 located away from the traction base 371. The traction fixation portion 372 has the bent portion BP in which the wire material extending frontward along the dentition is plastically deformed and bent toward the tooth root side. In a state in which the T-loop 374 of the traction force generation portion 373 is elastically deformed, the bent portion BP is hooked on the protruding portion (second slot 382) protruding to the palate side in the bracket 380 attached to the left first molar T1 as the traction target. This allows the traction member 370 to apply the rearward traction force and the frontward rotational force to the second slot of the bracket 380. As the reaction force to this, the force for moving frontward and outward is applied to the second connecting portion 362 of the arm member 360 from the traction member 370 (white arrow).

The traction member 370 is also attached to the arm member 360 attached to the first fixing portion 331. The traction target of the traction member 370 is a right first molar T11 located away from the traction base 371. The second connecting portion 362 of the arm member 360 to which the traction base portion 371 is attached is arranged on the palatal side of the tooth ahead of the right first molar T11. The traction fixation portion 372 has the bent portion BP in which the wire material extending frontward along the dentition is plastically deformed and bent toward the tooth root side. In a state in which the T-loop 374 of the traction force generation portion 373 is elastically deformed, the bent portion BP is hooked on the protruding portion (second slot 382) protruding to the palate side in the bracket 380 attached to the right first molar T11 as the traction target. This allows the traction member 370 to apply the frontward traction force and the rearward rotational force to the second slot 382 of the bracket 380. As the reaction force to this, the force for moving rearward and outward is applied to the second connecting portion 362 of the arm member 360 from the traction member 370 (white arrow).

Thus, in the orthodontic appliance 1002, the clockwise rotational force is applied to the base member 300 via the two arm members 360. However, as described previously, the base member 300 is firmly fixed by the four screws 350, and therefore the base member 300 is less likely to come loose.

The present embodiments and specific examples have been described above, but the present invention is not limited to these. For example, in the above description, the first cutting portion 112 has a recessed portion and the second cutting portion 212 has a protruding blade, but the first cutting portion 112 may have a protruding blade and the second cutting portion 212 may have a recessed portion.

The scope of the present invention encompasses those to which a person skilled in the art appropriately makes addition or removal of constitutional elements or design changes with respect to the previously-described embodiments or specific examples and those in which features of the embodiments are appropriately combined, provided that they have the subject matters of the present invention. For example, in the pliers for orthodontics 110 according to the second embodiment illustrated in FIG. 4, two sets of acting portions (right set of acting portions 41 and left set of acting portions 42) protrude laterally so as to be arranged in a direction along the normal line of the first plane S1 which is the symmetry plane, but the present invention is not limited to this. Each set of acting portions may protrude laterally along a line inclined frontward with respect to the normal line of the first plane S1. By arranging the acting portions in this way, the operation of bending the wire in the mouth cavity may be facilitated.

A method of attaching the orthodontic appliance according to the present embodiments relates to the following orthodontic appliance. Specifically, this orthodontic appliance comprises: a base member fixed to two or more screws implanted in the vicinity of median palatine suture of a palate bone; an arm-shaped arm member having a first connecting portion connected to the base member and a second connecting portion located in the vicinity of palatal side of a tooth; and a traction member that is made of an elastic wire material and pulls a tooth as the traction target. The traction member has a traction base portion fixed to the second connecting portion, a traction fixation portion hooked on a bracket that is fixed to the traction target located away from the traction base portion, and a traction force generation portion that is located between the traction base portion and the traction fixation portion and applies a rearward traction force and a frontward rotational force or a frontward traction force and a rearward rotational force to the bracket via the traction fixation portion. The traction fixation portion has a bent portion in which the wire material extending along the dentition is plastically deformed and bent toward the tooth root side. The bent portion is hooked on a protruding portion protruding to the palate side in the bracket. Here, the traction base portion is located behind a first molar, the traction force generation portion applies the rearward traction force and the frontward rotational force to the bracket, and the bent portion is a portion in which the wire material extending frontward is plastically deformed and bent toward the tooth root side. In the method of attaching the orthodontic appliance according to the present embodiments, when the traction member, which is made of an elastic wire material and pulls a tooth as the traction target, is engaged with a protruding portion protruding to the palate side in the bracket, the wire material is elastically deformed and cut by using pliers for orthodontics. The pliers for orthodontics include a pair of plier main bodies that are rotatable about a coupling portion. The pair of plier main bodies each have one end portion at which an acting portion is located and another end portion at which a grip portion is located. In the pliers for orthodontics, one of the pair of plier main bodies is a first plier having a clamping surface of the acting portion. The clamping surface is provided along a second direction that is angled at a predetermined angle with respect to a first direction in which the grip portion extends from the coupling portion. The acting portion includes a bending portion that bends the wire material to form a bent portion, a cutting portion that cuts the wire material on a tip side of the bent portion, and a holding portion that holds a wire piece formed by the cutting. The bending portion, the cutting portion, and the holding portion are arranged on the clamping surface along the second direction with the cutting portion as the center.

The invention claimed is:

1. An orthodontic appliance comprising:
    a base member fixed to two or more screws adapted to be implanted in a vicinity of median palatine suture of a palate bone;
    an arm-shaped arm member having a first connecting portion connected to the base member and a second connecting portion adapted to be located in a vicinity of palatal side of a tooth; and
    a traction member that is made of a wire material which is elastic and pulls a tooth as a traction target,
    the traction member having:
        a traction base portion fixed to the second connecting portion;
        a traction fixation portion hooked on a bracket that is adapted to be fixed to the traction target located away from the traction base portion; and
        a traction force generation portion that is located between the traction base portion and the traction fixation portion and applies a rearward traction force and a frontward rotational force or a frontward traction force and a rearward rotational force to the bracket via the traction fixation portion,
    the traction fixation portion having a bent portion in the wire material, and adapted to extend along dentition so that the wire material is plastically deformed and bent toward a tooth root side, the bent portion being hooked on a portion of the bracket that protrudes to a palate side of the bracket.

2. The orthodontic appliance according to claim 1, wherein
    the traction base portion is adapted to be located behind a first molar,
    the traction force generation portion applies the rearward traction force and the frontward rotational force to the bracket, and
    the bent portion is a portion in which the wire material that extends frontward is plastically deformed and bent toward the tooth root side.

* * * * *